(12) United States Patent  (10) Patent No.: US 8,028,682 B2
Clack  (45) Date of Patent: Oct. 4, 2011

(54) APPARATUS FOR IMPROVING EFFICIENCY AND EMISSIONS OF COMBUSTION WITH PERPENDICULAR OZONE ELEMENTS

(75) Inventor: David M. Clack, Quenomo, KS (US)

(73) Assignee: Clack Technologies LLC, Quenomo, KS (US)

( * ) Notice: Subject to any disclaimer, the term of this patent is extended or adjusted under 35 U.S.C. 154(b) by 407 days.

(21) Appl. No.: 12/352,767

(22) Filed: Jan. 13, 2009

(65) Prior Publication Data

US 2009/0133675 A1   May 28, 2009

Related U.S. Application Data

(63) Continuation-in-part of application No. 11/972,801, filed on Jan. 11, 2008, now Pat. No. 7,798,133.

(51) Int. Cl.
*F02M 27/00* (2006.01)
(52) U.S. Cl. .................................................. 123/539
(58) Field of Classification Search ........... 123/536–539
See application file for complete search history.

(56) References Cited

U.S. PATENT DOCUMENTS

| | | | |
|---|---|---|---|
| 1,873,746 A * | 8/1932 | English | 123/539 |
| 1,982,484 A | 11/1934 | Runge | |
| 2,960,975 A | 11/1960 | Bergstrom | |
| 4,308,844 A | 1/1982 | Persinger | |
| 4,519,357 A | 5/1985 | McAllister | |
| 5,010,869 A | 4/1991 | Lee | |
| 5,487,874 A | 1/1996 | Gibboney, Jr. | |
| 6,463,917 B1 | 10/2002 | Silver | |
| 6,601,570 B2 * | 8/2003 | Zetmeir | 123/536 |
| 7,341,049 B2 * | 3/2008 | Clack | 123/539 |
| 7,568,473 B2 * | 8/2009 | Motouchi | 123/536 |
| 7,798,133 B2 * | 9/2010 | Clack | 123/539 |
| 2005/0126550 A1 | 6/2005 | Varasundharosoth et al. | |
| 2006/0150614 A1 | 7/2006 | Cummings | |
| 2009/0095266 A1 * | 4/2009 | Burmenko | 123/537 |

* cited by examiner

*Primary Examiner* — M. McMahon
(74) *Attorney, Agent, or Firm* — Martin & Associates LLC; Bret J. Petersen

(57) ABSTRACT

An apparatus improves the efficiency and emissions of a combustion process by producing sufficient amounts of ozone in the air flow to the combustion chamber to enable more complete and cleaner combustion of the fuel. An ozone cell comprises a plurality of cylindrical ozone elements for producing ozone disposed within a housing that is placed in the air intake to a combustion chamber such as a diesel engine. The ozone elements are bonded together in a block and placed perpendicular to the air flow in the cell. The ozone elements are bound together in the block with a block plate at the top and bottom of the block with the ozone elements running lengthwise from the top to the bottom of the block.

17 Claims, 5 Drawing Sheets

APPARATUS FOR IMPROVING EFFICIENCY AND EMISSIONS OF COMBUSTION WITH PERPENDICULAR OZONE ELEMENTS

CROSS-REFERENCE TO PARENT APPLICATIONS

This patent application is a continuation-in-part of U.S. Ser. No. 11/972,801, filed Jan. 11, 2008 which is a continuation-in-part of U.S. Ser. No. 11/182,546 filed Jul. 15, 2005 by the same inventor and having the same title, and which are incorporated herein by reference.

BACKGROUND

1. Technical Field

The disclosure and claims herein generally relate to combustion processes, and more specifically relate to an apparatus for improving the efficiency and emissions of a combustion process such as an internal combustion engine.

2. Background Art

It has been observed that automobiles run better after a thunderstorm. It is believed that this phenomenon is primarily caused by the natural conditions that exist after an electrical storm, namely, the presence of ozone and an increase in the relative amount of negative ions in the air. These conditions increase the efficiency of the internal combustion process by increasing the density of the air charge or the quantity of air supplied to the cylinder during a single cycle and increasing the ozone which contains more oxygen than diatomic oxygen. The combination of a denser air charge and more oxygen increases the cylinder pressure, which increases the engine torque and horsepower output. By increasing the engine's ability to do work, less fuel is used to perform the same work as an engine in a normal situation.

The conditions observed after a thunderstorm last for only a short period of time because the concentration of ozone following a thunderstorm is very small (about 1 part per billion), and the relative imbalance of negative ions quickly reverts back to the usual positive/negative ion ratio at the earth's surface. For a short time after a thunderstorm, however, engines run more efficiently and use less gasoline.

Introduction of ozone into a combustion chamber like the conditions after a thunderstorm have been attempted to increase the efficiency of the combustion by increasing the amount of oxygen into the combustion for a given volume of air. Devices to add ozone gas and charged ions to a combustion chamber in an internal combustion engine have been described in the prior art. For example, in U.S. Pat. No. 1,982,484 issued to Runge, a distributor of an internal combustion engine is utilized to produce ozone gas which is then added to the combustion mixture flowing through an intake manifold of the engine. U.S. Pat. No. 4,308,844 to Persinger also describes improving the efficiency in an internal combustion engine by providing an ozone generator cell in the air supply to an engine. The ozone generator cell is a single tubular anode inside a tubular cathode that ionizes a relatively small volume of air to the engine.

FIG. 1 shows a prior art ozone generator used to enhance the efficiency of combustion. In FIG. 1, an ozone cell 110 is suitably disposed between the air intake 120 and a combustion chamber 130 to produce ozone and induce a charge in the air supply. In some prior art ozone generators, the ozone cell incorporates a single flat plate for the cathode and a single flat plate for the anode, and in others, the ozone cell is a single tubular anode and a single tubular cathode. The tubular cells were also shown to be placed with other tubular cells in series. An electric source is applied between the anode and cathode of the ozone cells. The electric source on the anode and cathode creates an electric field that splits oxygen molecules in the ambient air, leaving two single, highly active atoms of oxygen that combine with other oxygen to produce ozone ($O_3$). Ozone provides 50% more oxygen in its molecule, thereby providing faster and complete combustion, thereby providing more power to an engine.

While the foregoing devices to some extent may have accomplished their intended objectives, there is still a need to provide further improvement to the efficiency of an internal combustion engine. In particular, the prior art devices have not produced a sufficient volume of ozone to be effective. Without a way to improve combustion, the industry will continue to suffer from inefficiency and poor engine performance.

BRIEF SUMMARY

An apparatus is described to improve the efficiency and emissions of a combustion process by producing sufficient amounts of ozone in the air flow to the combustion chamber to enable more complete and cleaner combustion of the fuel. An ozone cell comprises a plurality of cylindrical ozone elements for producing ozone disposed within a housing that is placed in the air intake to a combustion chamber such as a diesel engine. The ozone elements are bonded together in a block and placed perpendicular to the air flow in the cell. The ozone elements are connected with a block plate at the top and bottom of the block with the ozone elements running lengthwise from the top to the bottom of the block.

The apparatus includes one or more vortex scrubbers or vanes in the housing to cause the air flow to have a vortex action to increase the amount of ozone that flows into the combustion chamber.

The foregoing and other features and advantages of the invention will be apparent from the following more particular description and as illustrated in the accompanying drawings.

BRIEF DESCRIPTION OF DRAWINGS

The disclosure will be described in conjunction with the appended drawings, where like designations denote like elements, and.

DETAILED DESCRIPTION

The description and claims herein are directed to an apparatus to improve the efficiency and emissions of a combustion process by producing sufficient amounts of ozone in the air flow to the combustion chamber to provide more complete and cleaner combustion of the fuel. In a preferred implementation, a plurality of ozone elements are disposed within a housing that is in placed in the air intake to a combustion chamber such as a diesel engine. The cell elements create an electrical plasma field that produces ozone.

Figure 1:
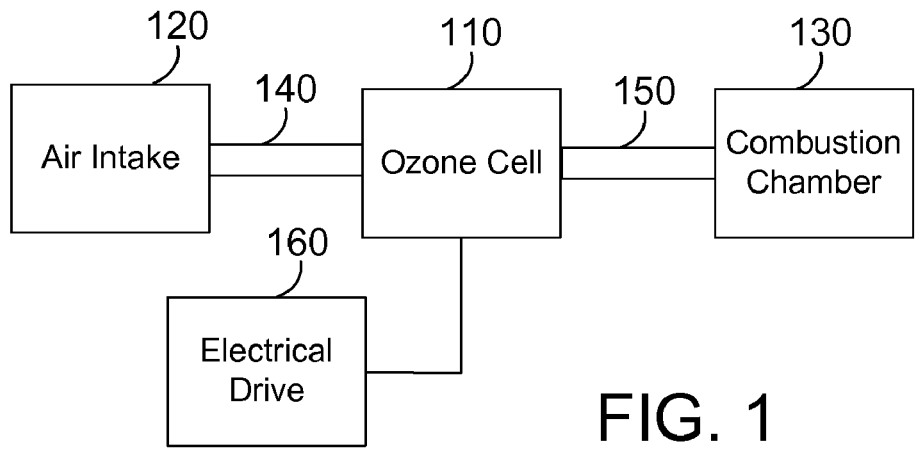
FIG. 1 is a block diagram of an apparatus in accordance with the prior art for providing ozone to a combustion chamber.
Figure 2:
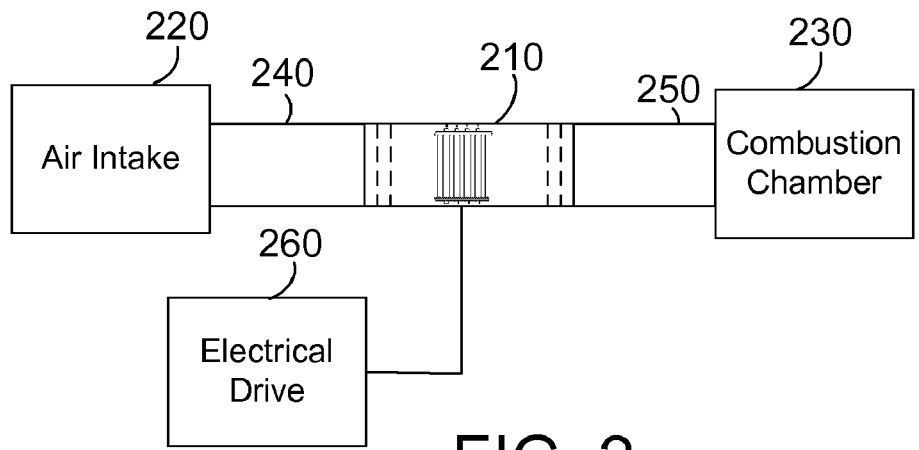
FIG. 2 is system view of an apparatus for providing ozone to a combustion chamber.

FIG. 2 shows an ozone cell 210 used to enhance the efficiency of combustion as described herein. The primary internal components are visible for illustration to match the description in FIG. 3. In FIG. 2, an ozone cell 210 is suitably disposed between an air intake 220 and a combustion chamber 230 to produce ozone and induce a charge in the air supply of a combustion process. Alternatively, the ozone cell is incorporated into the air intake pipe of an existing engine setup. The combustion process may be an internal combustion engine such as a diesel truck engine or a gasoline combustion engine such as used in automobiles. Alternatively, the combustion processes could also be combustion processes such as those used for electric power generation, furnaces, water heaters, or virtually any other combustion process.

Again referring to FIG. 2, the ozone cell 210 is connected in the supply line 240 from the air intake 220 and connected to the combustion chamber 230 with a supply line 250. The ozone cell can be mounted in any suitable configuration and could be located at a convenient position which allows the gaseous output to be transmitted to the combustion chamber 230 by a supply line 250. The ozone cell 210 is energized by an electrical drive circuit 260, which is described further below with reference to FIG. 4. The electrical drive circuit 260 creates an electrical field that creates a plasma field for producing ozone between and around the ozone elements described below.

Figure 3:
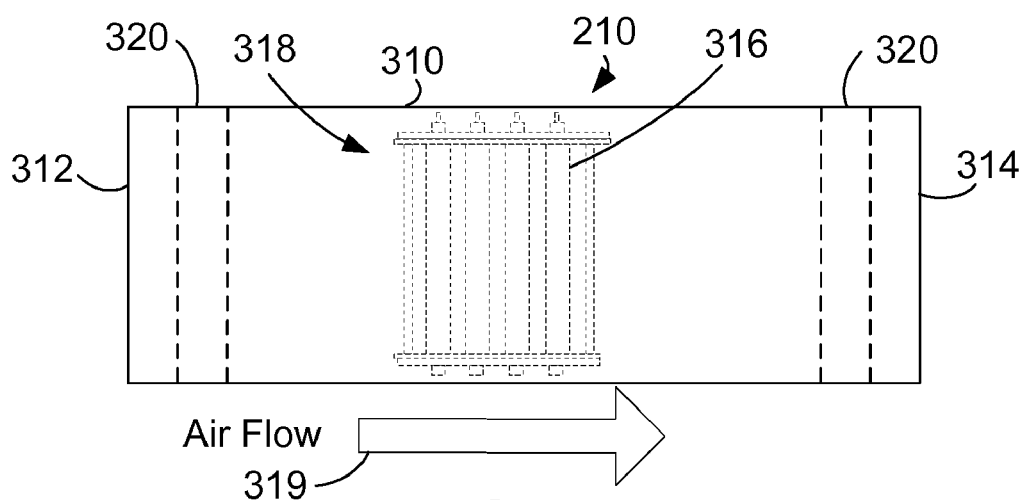
FIG. 3 is an enlarged view of the ozone cell 210 shown in FIG. 2 for providing ozone to a combustion chamber.
Figure 5:
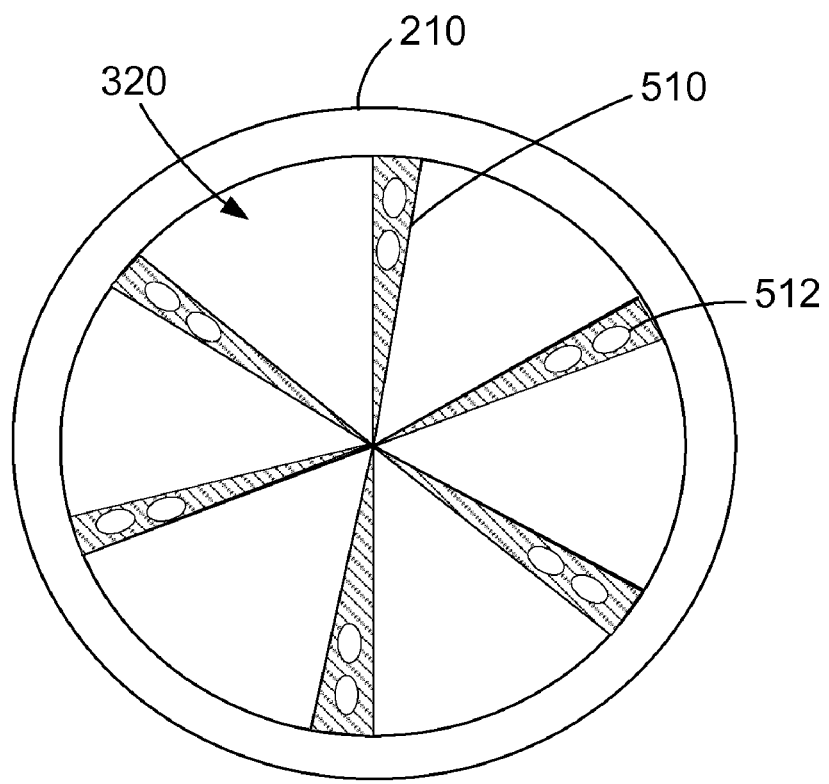
FIG. 5 is a vortex scrubber apparatus with holes for added air turbulence.

FIG. 3 shows an external view of the ozone cell 210 with the primary internal components also visible in phantom lines. In this implementation, the ozone cell 210 includes a housing 310 that may comprise a conductive pipe such as stainless steel or a non-conductive pipe of PVC or similar material. The housing 310 is preferably capable of carrying ozone gas and charged air without excessive deterioration. The housing 310 has in input end 312 and an output end 314. The housing 310 may be larger in diameter than the supply lines 240, 250 (FIG. 2) so that the addition of ozone elements 316 will not significantly restrict air flow through the ozone cell 210. In the illustrated configuration, the ozone cell 210 includes a block 318 of multiple ozone elements 316 within the housing. The block is placed in the housing so that the length of the ozone elements is perpendicular to the air flow 319 through the ozone cell 210. The arrangement of the ozone elements 316 within the housing is described further below in conjunction with FIG. 8 and FIG. 11. The ozone elements are cylindrical in shape and bound together as described below. The overall length of the ozone elements can vary depending on the diameter of the housing and the amount of ozone needed in the application. FIG. 3 further illustrates the location of vortex scrubbers 320 that provide air turbulence disposed in each end of the housing. Further detail of the vortex scrubbers is shown in FIG. 5 and described in the related text below.

Tests by the inventor herein indicate that a reduced temperature of the ozone cell increases the amount of ozone available to the combustion chamber. Tests indicated that a low frequency in combination with a lower voltage keeps the ozone elements within only a few degrees above ambient air temperature which produces a productive corona or plasma field for increased ozone available to the combustion chamber compared to prior art ozone generator cells. Preferably the increase in the air temperature is less than 10 degrees, and in most preferably, the increase in the air temperature is less than 5 degrees.

Figure 4:
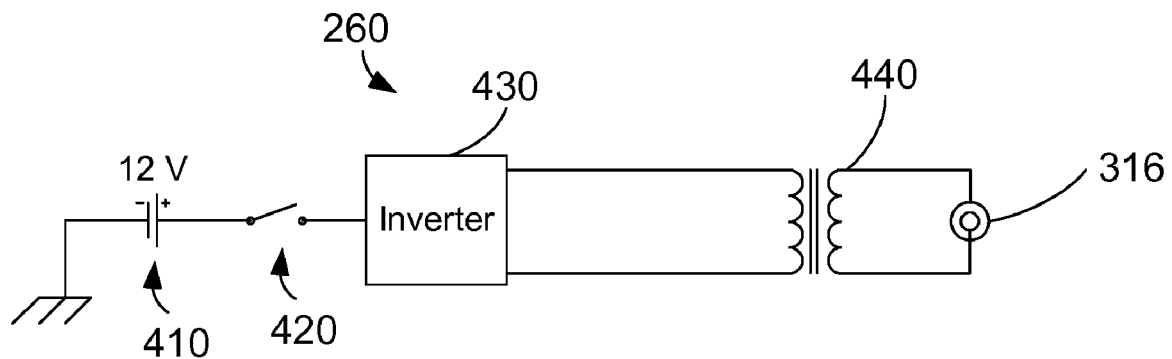
FIG. 4 is a schematic diagram of an electrical drive circuit.

FIG. 4 illustrates details of the electrical drive circuit 260 introduced in the discussion of FIG. 2. The electrical drive circuit 260 for the ozone cells includes a battery such as a standard rechargeable twelve volt lead-acid battery of the type usually associated with internal combustion engines. In automotive applications the battery can be the same as the one equipped on the vehicle since the current draw of the drive circuit 260 is minimal. The current from the battery 410 is connected through a switch 420 to an inverter 430 which converts the electrical output of the battery 1410 to an AC voltage. The output of the inverter 430 is connected to a transformer 440. A suitable transformer for use in connection with the present invention is described further below. The secondary winding of the transformer 440 is connected to the ozone elements 316 as described above. The secondary winding voltage is preferably from about 6,000 volts to about 12,000 volts AC. The most preferred is a voltage of about 7,000-8,500 volts AC. The preferred frequency is about 60 to 1000 Hz, with the most preferred frequency about 60 Hz. Preferably, the transformer is an oil filled, iron core transformer with copper wrap coils, that has the following electrical characteristics:

Input: 120 vac/60 hz
output: 7-8.5 kvac/27 ma
Max Pri Va 260
Max Pri Watts 125
Open Sec KvRMS 7-8.5
Short Sec Ma 27

FIG. 5 illustrates a vortex scrubber 320 as viewed from the end of the ozone cell 210. In this example, the vortex scrubber 320 comprises six fins 510 equally spaced in the housing 320. The fins 510 are bent to have a propeller like shape to disturb the air flow and cause the air to have turbulence. A vortex scrubber may be placed on each end of the housing as shown in FIG. 5, with a first set of fins is in the intake end 312 of the housing 320 and the second set of fins is in the output end 314 of the housing 320. Alternatively, the two vortex scrubbers may be on either end of the housing 210. The fins 510 alternatively include a pattern of holes 512 to increase the air turbulence. The air turbulence increases the exchange of fresh air at the surface of the ozone cell with the ozone containing air to increase the available ozone exiting the ozone cell 210.

Figure 6:
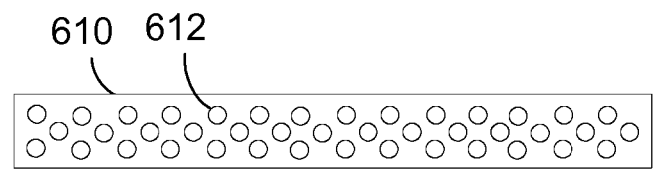
FIG. 6 is a side view of the outer electrode of an ozone element.

FIGS. 6-12 illustrate the components and build up of the block 318 and ozone elements 316. The ozone elements 316 basically comprise two conductive electrodes separated by an insulator. FIG. 6 shows a front view of an outer electrode 610. The outer electrode 610 is a cylindrical shaped tube. The insulator and inner electrode is placed inside the outer electrode as described below. The outer electrode 610 preferably has a pattern of holes 612. The pattern of holes allows turbulent air flow to flow through the pattern of holes 612 in the outer electrodes 610 and between the insulator (described below) and outer electrode 610. The holes 612 preferably cover about 45 to 50 percent of the surface of the outer electrode 610. The holes 612 are preferably round with a diameter of about 0.1 inches.

Figure 7:
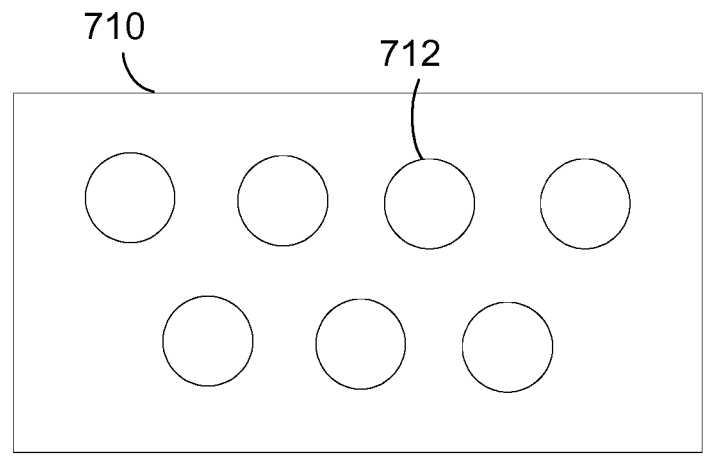
FIG. 7 is a top view of a block plate.

FIG. 7 illustrates a top view of a block plate 710. The block plate 710 is used at the bottom and top of the element block 318 (FIG. 3) to bind the outer electrodes of an electrode block together. The block plate 710 has a pattern of holes, with one hole 712 for each ozone element. The holes 712 have a diameter slightly larger than the outside diameter of the outer electrode such that the ends of the outer electrodes 610 can slide inside the block plate 710. Alternatively, the holes in the block plate could be the same diameter as the inner diameter of the outer electrodes to allow the insulators to pass through the holes and the outer electrodes could be attached by other means such as by welding the outer electrodes to the block plate.

Figure 8:
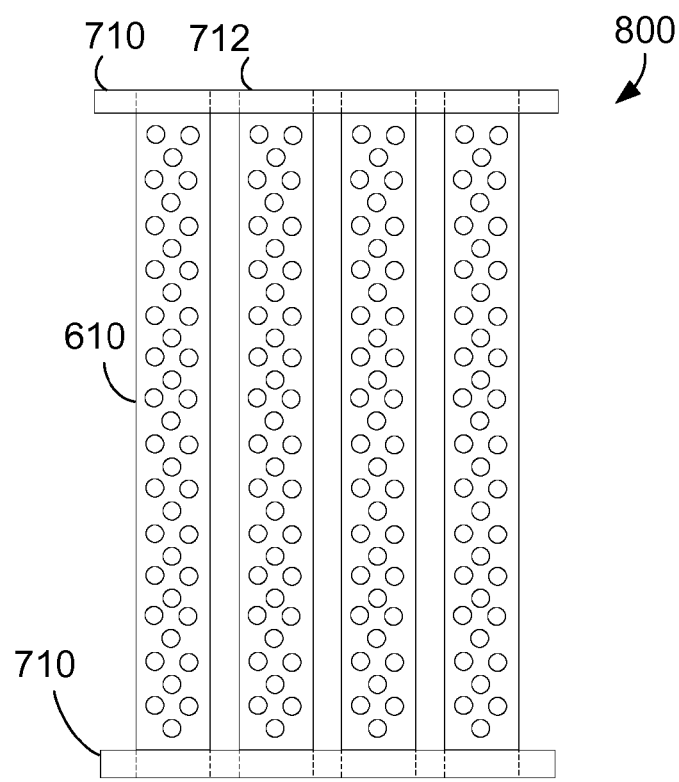
FIG. 8 is a front view of a block of outer electrodes installed in the top and bottom block plates.

FIG. 8 illustrates a front view of a partially built block 800 of ozone elements. One block plate 710 is placed at the top of the block and another block plate 710 is placed at the bottom of the block 800. Outer electrodes 610 are placed in each of the holes 712. In FIG. 8, only four of the seven outer electrodes are shown for simplicity of the drawing. The outer electrodes 610 extend through the base plates 710 as shown and described above. The outer electrodes are electrically connected to the block plate by press fitting into the block plate and/or welding them to the block plate.

Figure 9:
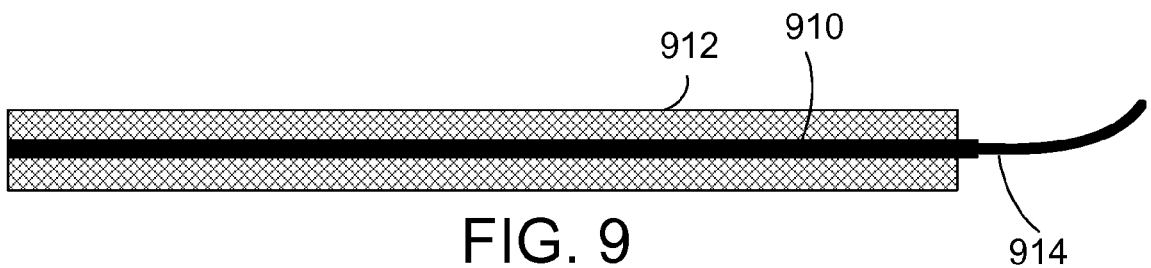
FIG. 9 is cross-sectional view of an inner electrode and insulator for an ozone element.

FIG. 9 illustrates a cross-sectional view of a cylindrically shaped inner electrode 910 surrounded by a cylindrically shaped insulator 912. The inner electrode 910 maybe a solid metal electrode as shown, or it can be hollow (e.g. made of an open pipe). The inner electrode 910 is connected to an electrical conductor 914. The electrical conductor 914 is electrically and mechanically connected to the inner electrode 910 in a suitable manner, such as soldering, or in the case of a hollow electrode, crimping to the inner electrode. The inner electrode is preferably made of stainless steel wire or pipe that is inserted in the insulator 912. The insulator is preferably a ceramic material such as glazed or unglazed ceramic or porcelain. Other insulators could also be used such as polyethylene, PVC or other insulators as used in the prior art.

Figure 10:
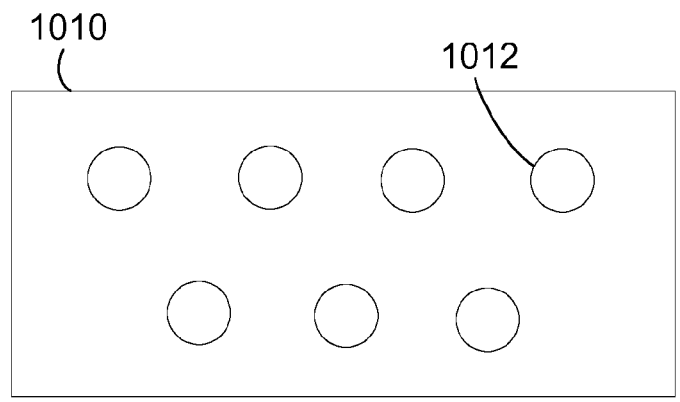
FIG. 10 is a top view of an insulator plate.

FIG. 10 illustrates a top view of an insulator plate 1010. The insulator plate 1010 is made of a suitable insulating material such as plastic, acetal resin, or nylon. The insulator plate 1010 is used at the bottom and top of the block 318 (FIG. 3) of ozone elements to hold the ozone elements in place and insulate the block plate from the center electrode 910. The insulator plate 1010 has a pattern of holes, with one hole 1012 for each ozone element. The holes 1012 have a slightly larger diameter than the outside diameter of the insulator 912 such that the ends of the insulator can extend through the insulator plate 710 as described below.

Figure 11:
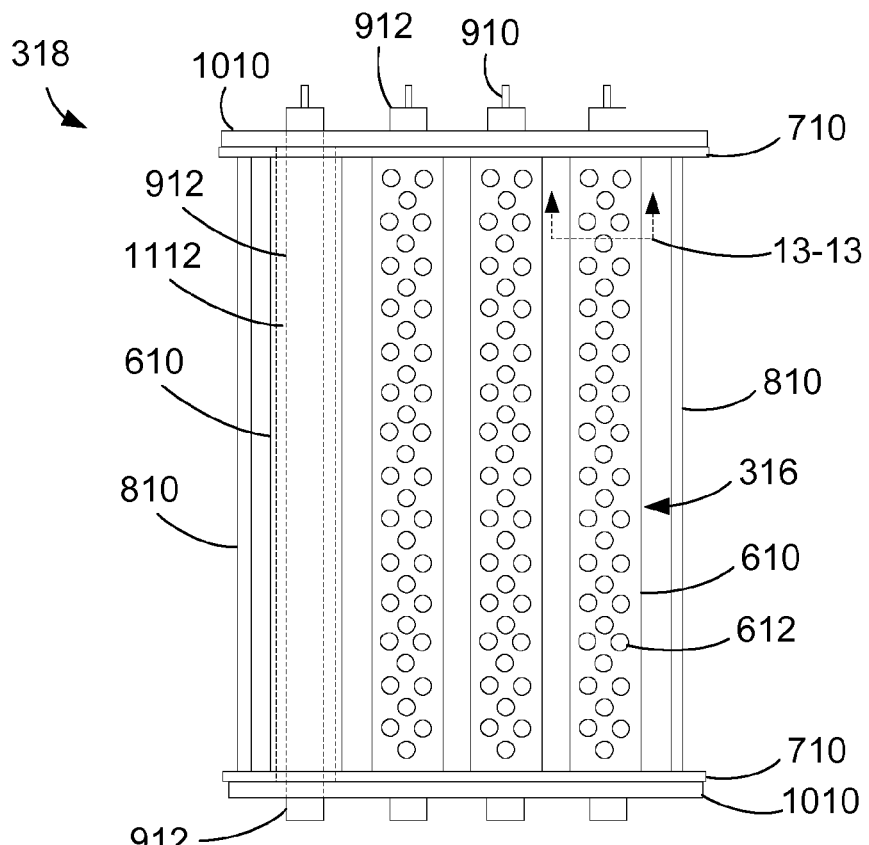
FIG. 11 is a front view of a block of ozone elements.

FIG. 11 illustrates a front view of a block 318 of the ozone elements 316. FIG. 11 is similar to FIG. 8 and illustrates the block of ozone elements after installing the insulator plates 1010, insulators 912 and inner electrodes 910 to the base plates 710 with the attached outer electrodes 710. The insulator plates 1010 are placed on top of the base plates 710 and the insulator 912 with the inner electrodes 910 placed inside the hole of the insulator plate. The insulator plate holds the insulators centered in the outer electrode such that an air gap 1112 is formed between the insulator 912 and the outer electrode 610. The left most ozone element in FIG. 11 is shown without the holes in the outer electrodes to illustrate in phantom the lines formed by the outer electrode and the inner electrode to illustrate the air gap 1112. The insulator 912 with the inner electrode 910 may be held in place in the insulator plate with high temperature epoxy, silicone, or other suitable means. The block 318 of ozone elements 316 may be secured together with structural members 810 to provide additional strength to the block 318. The structural members 810 may be welded to the base plates 710 or may be bolts that pass through (not shown) the block plates 710 and insulator plates 1010.

Again referring to FIG. 11, the openings or holes 612 in the outer electrode 610 allow air to pass to the air gap 1114 between the outer electrode and the insulator 912. While the air gap 1114 allows air to circulate between the outer electrode and the insulator, air does not flow axially through the air gap where the ends of the ozone element are sealed by the insulator plates 1010. Air movement in the air gap 1114 is a turbulent air flow through the openings 612 in the outer electrode 610 meaning only that air that enters through the opening 612 exits through the openings 612.

Figure 12:
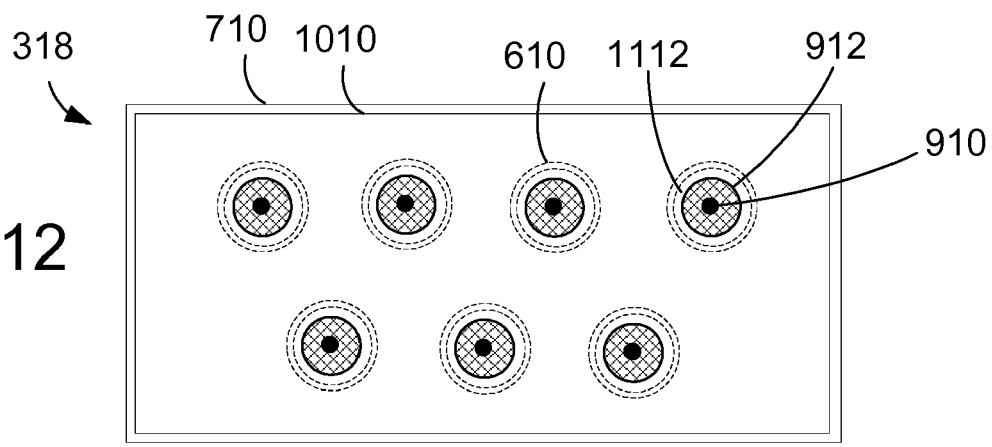
FIG. 12 is a top view of a block of ozone elements.

FIG. 12 illustrates a top view of a block 318 of the ozone elements 316 shown in FIG. 11. A block plate 710 is seen as being larger than the insulator plate 1010 but the block plate could be the same size or smaller that the insulator plate. The outer electrode 610 is visible as phantom circles around the protruding insulator 912 and inner electrode 910. The air gap 1112 is the space between the outer electrode 610 and the insulator 912.

Figure 13:
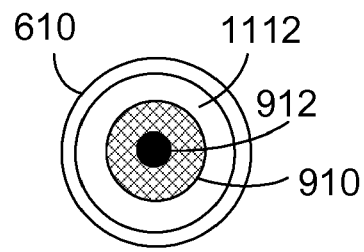
FIG. 13 is a cut away view of the ozone cell shown in FIG. 11 along lines 13-13.

FIG. 13 illustrates a cross-sectional view of an ozone element 316 shown in FIG. 11 taken along the line 13-13. The ozone element 316 cross section shows the inner electrode 912 surrounded by the insulator 910. The insulator 910 is surrounded by the outer electrode 610 with a space or air gap 1112 between the insulator and the outer electrode. The inner electrode 912 is preferably a solid wire about 0.100 inches in diameter and the outer electrode 610 is about 0.350 inches in diameter. The outer electrode 610 is preferably made of a stainless steel tube, or stainless steel sheet rolled into a tube shape with a thickness about 0.0125 to 0.025 inches. Further, in this example, the insulator 912 is preferably a porcelain tube with an outer diameter of about 0.250 inches and an inner diameter of about 0.100 to snuggly accept the inner electrode 910. Other insulators could also be used such as polyethylene, PVC or other insulators as used in the prior art. In this example implementation, the air gap between the outer electrode and the insulator is about 0.0375 inches. In the illustrated implementation, the inner electrodes are about 2.5 inches in length and the insulator and inner electrodes are slightly longer to protrude from inside the inner electrodes as shown.

Figure 14:
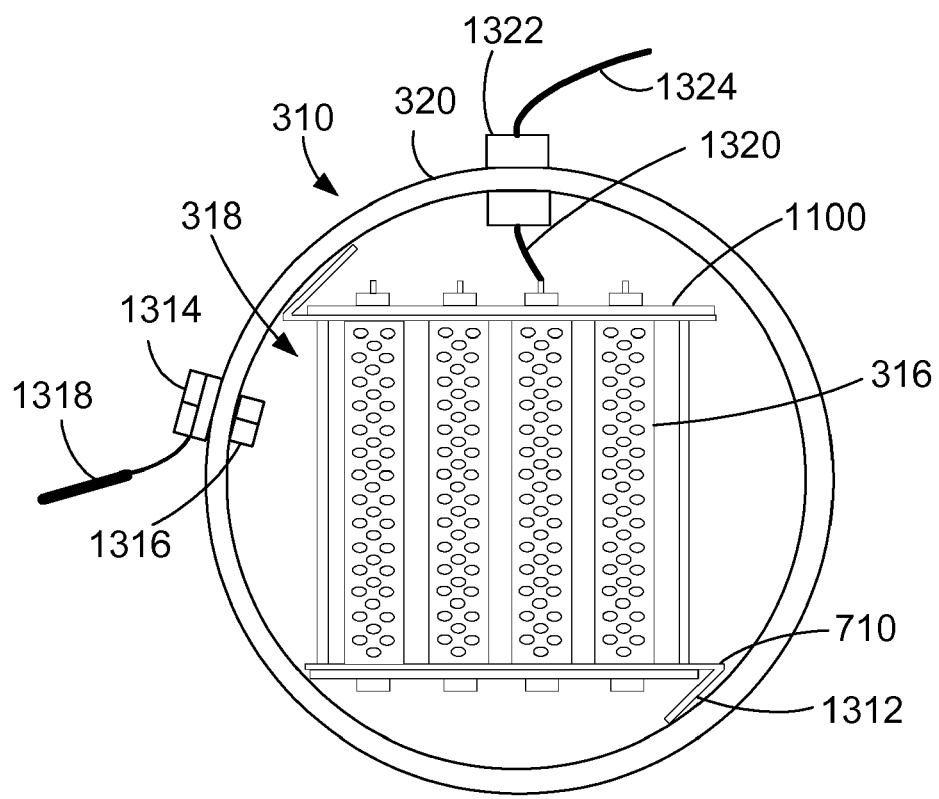
FIG. 14 is an end view of an open ozone cell having ozone elements as described in FIGS. 6 through 13.

FIG. 14 illustrates an end view of an open ozone cell 210 having a block 318 of ozone elements 316 as described above. (The vortex scrubbers that would normally be visible inside the cell are not shown.) The block 318 is shown with bonding tabs 1312 extending from the block plates 710 that attach the block of ozone elements to the inside the ozone cell 210. The bonding tabs 1312 preferably include means to attach the ozone elements into the housing 310. The means for attachment may include welding, rivets, bolts, or other suitable means. In FIG. 14, the ozone cell housing 310 is a conductive metal housing. The bonding tabs 1312 provide electrical connection between the block 318 of ozone elements 316 and the ozone cell housing 320. The ozone cell housing 320 is then connected to the electrical circuit described with reference to FIG. 4 through an electrical connection 1316. In this example, the electrical connection 1314 is a wire 1318 bolted 1316 to the ozone cell housing 320. Thus, through the bonding tabs 1312, the block plate, and the wire 1318, all the outer electrodes are connected to the electrical circuit. The electrical connection 1314 may be through a chassis ground connection where the ozone cell housing is directly connected to chassis ground (now shown) instead of through a wire as shown. As described above, the inner electrodes of the ozone elements are also connected to the electrical circuit. For simplicity, only a single electrical connection to the inner electrode of an ozone element is shown in FIG. 14. A conductive wire 1320 connects to an ozone element 316 in the manner described above. The conductive wire 1320 passes through the cell housing 310 through a sealing grommet 1322. The connections to the other ozone elements 316 are made in a similar manner and preferably are connected together in parallel (not shown) before passing outside the cell housing.

The disclosure and claims herein are directed to an apparatus that provides significant improvements over the prior art. An apparatus and method was described that increases combustion efficiency and performance and lowers emissions of virtually any combustion process. An ozone cell as described herein provides improved efficiency and performance and lower emissions in an internal combustion engine such as a diesel truck engine.

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. An apparatus for increasing efficiency of combustion comprising:
    a housing adapted to be disposed between an air intake and a combustion chamber to supply air flow to the combustion chamber;
    a block of ozone elements with a top and a bottom arranged in the housing for creating ozone;
    wherein the block of ozone elements comprises a plurality of cylindrical ozone elements having a length;
    wherein the block of ozone elements is disposed in the housing with the length of the elements perpendicular to the air flow through the housing;
    wherein the plurality of ozone elements are bound together with a block plate at the top and a block plate at the bottom of the block of ozone elements, and wherein the block plates at the top and bottom have holes for outer electrodes for each of the ozone elements; and
    wherein the block of ozone elements further comprises an insulator plate at the top and bottom of the block of ozone elements, and wherein the insulator plate at the top and the bottom of the block of ozone elements each have holes for insulators of the ozone elements to extend through the insulator plates.

2. The apparatus of claim 1 wherein the plurality of ozone elements further comprise an inner electrode and an outer electrode made of stainless steel separated by a ceramic insulator and an air gap, and wherein the outer electrode has a pattern of holes to allow air to flow between the outer electrode and ceramic insulator.

3. The apparatus of claim 2 wherein the inner electrode is stainless steel with a diameter of about 0.100 inches, the insulator is a tube of ceramic material with an inner diameter that provides a snug fit to the inner electrode and an outer diameter of about 0.250 inches, and the outer electrode is a stainless steel tube with an outer diameter of about 0.350 inches and a thickness of about 0.0125 inches.

4. The apparatus of claim 2 wherein the insulator is made of a glazed porcelain material.

5. The apparatus of claim 1 further comprising a vortex scrubber in the housing to produce a vortex motion of air moving through the housing, the vortex scrubber comprising a plurality of fins with a pattern of holes.

6. The apparatus of claim 1 wherein the combustion chamber is the cylinder of a diesel combustion engine.

7. The apparatus of claim 1 wherein the housing comprises a conductive, stainless steel pipe.

8. The apparatus of claim 2 wherein the inner electrodes and the outer electrodes of the block of ozone elements are connected together respectively and coupled to a drive voltage about 7,000-8,500 volts AC.

9. The apparatus of claim 1 wherein a low temperature plasma field around the ozone elements increases the air temperature between the air intake and the combustion chamber no more than 10 degrees.

10. An apparatus for increasing efficiency of an internal combustion engine comprising:
    a housing adapted to be disposed between an air intake and a combustion chamber to supply air flow to the combustion chamber;
    a block of ozone elements with a top and a bottom arranged in the housing for creating ozone;
    wherein the block of ozone elements comprises a plurality of cylindrical ozone elements having a length bound together with a block plate at the top and a block plate at the bottom of the block of ozone elements, wherein the plurality of ozone elements further comprise an inner electrode and an outer electrode made of stainless steel separated by a ceramic insulator and an air gap, and the outer electrode has a pattern of holes to allow air to flow between the outer electrode and ceramic insulator;
    wherein the block of ozone elements is disposed in the housing with the length of the elements perpendicular to the air flow through the housing; and
    wherein the block of ozone elements further comprises an insulator plate at the top and bottom of the block of ozone elements, and wherein the insulator plate at the top and the bottom of the block of ozone elements each have holes for insulators of the ozone elements to extend through the insulator plates.

11. The apparatus of claim 10 wherein the block plate at the top and bottom have holes for outer electrodes for each of the ozone elements.

12. The apparatus of claim 10 wherein the insulator is made of a glazed porcelain material.

13. The apparatus of claim 10 further comprising a vortex scrubber in the housing to produce a vortex motion of air moving through the housing, the vortex scrubber comprising a plurality of fins with a pattern of holes.

14. The apparatus of claim 10 wherein the combustion chamber is the cylinder of a diesel combustion engine and wherein the housing comprises a conductive, stainless steel pipe.

15. The apparatus of claim 10 wherein the inner electrodes and the outer electrodes of the block of ozone elements are connected together respectively and coupled to a drive voltage about 7,000-8,500 volts AC.

16. The apparatus of claim 10 wherein a low temperature plasma field around the ozone elements increases the air temperature between the air intake and the combustion chamber no more than 10 degrees.

17. An internal combustion engine with an ozone cell for increasing the efficiency of combustion, the ozone cell comprising:
    a conductive metal housing disposed between an air intake and a combustion chamber of the internal combustion engine to supply air flow to the combustion chamber;
    a block of ozone elements with a top and a bottom arranged in the housing for creating ozone;
    wherein the block of ozone elements comprises a plurality of cylindrical ozone elements having a length bound together with a block plate and an insulator plate at the top and a block plate and insulator plate at the bottom of the block of ozone elements, wherein the block plates at the top and bottom have holes for outer electrodes for each of the ozone elements, wherein the insulator plate at the top and bottom of the block of ozone elements each have holes for insulators of the plurality ozone elements to extend through the insulator plates, wherein the plurality of ozone elements further comprise an inner electrode and an outer electrode made of stainless steel separated by a ceramic insulator and an air gap, wherein the outer electrode has a pattern of holes to allow air to flow between the outer electrode and ceramic insulator; and wherein the block of ozone elements is disposed in the housing with the length of the elements perpendicular to the air flow through the housing.

* * * * *